US011288701B2

(12) United States Patent
Dabas et al.

(10) Patent No.: US 11,288,701 B2
(45) Date of Patent: Mar. 29, 2022

(54) METHOD AND SYSTEM FOR DETERMINING EQUITY INDEX FOR A BRAND

(71) Applicant: WNS GLOBAL SERVICES (UK) LIMITED, London (GB)

(72) Inventors: Prashant Dabas, Haryana (IN); Kamal Chawla, Haryana (IN); Tushar Kakkar, Haryana (IN)

(73) Assignee: WNS GLOBAL SERVICES (UK) LIMITED, London (GB)

( * ) Notice: Subject to any disclaimer, the term of this patent is extended or adjusted under 35 U.S.C. 154(b) by 589 days.

(21) Appl. No.: 16/304,724

(22) PCT Filed: May 26, 2017

(86) PCT No.: PCT/IB2017/053103
§ 371 (c)(1),
(2) Date: Nov. 27, 2018

(87) PCT Pub. No.: WO2017/203473
PCT Pub. Date: Nov. 30, 2017

(65) Prior Publication Data
US 2021/0224843 A1 Jul. 22, 2021

(30) Foreign Application Priority Data
May 27, 2016 (IN) ............................ 2016211018362

(51) Int. Cl.
*G06Q 30/00* (2012.01)
*G06Q 30/02* (2012.01)
(Continued)

(52) U.S. Cl.
CPC ....... *G06Q 30/0246* (2013.01); *G06F 16/285* (2019.01); *G06Q 50/01* (2013.01)

(58) Field of Classification Search
CPC ... G06Q 30/0246; G06Q 50/01; G06F 16/285
See application file for complete search history.

(56) References Cited

U.S. PATENT DOCUMENTS 8,620,718 B2 * 12/2013 Varghese ............... G06Q 50/01
705/7.29
9,177,060 B1 * 11/2015 Bennett ................. G06F 16/951
(Continued)

FOREIGN PATENT DOCUMENTS

WO 2013/059290 4/2013
WO 2014/207753 12/2014

OTHER PUBLICATIONS

Lovett, Altimeter Group.*
PCT International Search Report, International Application No. PCT/IB2017/053103, dated Sep. 4, 2017, pp. 1-2.

*Primary Examiner* — David J Stoltenberg
*Assistant Examiner* — Michael I Ezewoko
(74) *Attorney, Agent, or Firm* — Hunton Andrews Kurth LLP (57) ABSTRACT

The present disclosure relates to analysis of content to determine an equity index of a brand by building a data record by procuring input data from at least one platform; enriching the data record to remove noise from the input data to obtain an enriched data record; classifying the enriched data record into at least one category of one or more categories to obtain a classified data record; determining a sentiment ratio for the classified data record; determining an engagement metrics for the brand; and determining the equity index for the brand based on the at least one category and the sentiment ratio, the sentiment ratio and one or more variables.

14 Claims, 3 Drawing Sheets

(51) Int. Cl.
*G06F 16/28* (2019.01)
*G06Q 50/00* (2012.01)

(56) References Cited

U.S. PATENT DOCUMENTS 9,471,883 B2 * 10/2016 Chatterjee ............... G06F 16/35
2014/0136541 A1 5/2014 Omar

* cited by examiner

METHOD AND SYSTEM FOR DETERMINING EQUITY INDEX FOR A BRAND

RELATED APPLICATIONS

The present application makes reference to, claims priority to, and claims benefit of Indian Provisional application No. 201611018362 entitled "METHOD AND SYSTEM FOR ANALYZING ELECTRONIC CONTENT" filed on May 27, 2016, the complete subject matter of which is hereby incorporated herein by reference, in its entirety.

FIELD OF INVENTION

The invention relates generally to analysis of content in a collaborative environment, and more particularly to methods and systems for gathering and analyzing electronic content to determine equity index for a brand.

BACKGROUND

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and not as admissions of prior art.

In the present world, the Internet has become one of the most prominent platforms for advertisements in addition to the traditional media and is used by brands globally. One of the most important aspects of a promotion campaign is to understand the popular opinion about the brand and the standards and trends of the industry relating to the brand. However, the content on online media of the present times is very prone to erroneous interpretation because of its diverse, disparate, divisive and distracting nature. This often leads to lack of clarity in the insights drawn as there is no single version of an accurate interpretation of the content in the absence of any unified benchmark leveraging understanding of the content from the context of both the industries relevant to the brand's domain and the social media. As a result, the actions that a brand company may take relating to profits, promotions etc. may be based on unclear insights or assistance and, therefore, be untimely and may even cause more harm to the brand's business than good. The existing tools do not have the mechanism to gather relevant information about the brand from multiple platforms and analyze the information in a meaningful way so as to convert into a value which gives insights into the virality, theme, influence, sentiment and customer satisfaction for a brand. Moreover, the existing tools do not enable the brand owners the ability to benchmark the brands' performance against the industry competitors' and derive an optimal strategy.

Thus, there is a need arising for real-time solutions that are enabled with intelligence of both industry domain expertise and the latest social media content relevant to the brand and which enable brand owners to proactively engage with high value, risky customers. More particularly, solutions which provide the true picture of a brand's social reputation in terms of a quantifiable value based on a unique and comprehensive industry benchmark are required.

SUMMARY OF THE INVENTION

This section is provided to introduce certain objects and aspects of the disclosed methods and systems in a simplified form that are further described below in the detailed description. This summary is not intended to identify the key features or the scope of the claimed subject matter.

In view of the shortcomings of existing methods and systems, as discussed in the background section, it is apparent that there exists a need for developing an improved solution to finding a brand's equity index that not only overcomes the problems of the prior art but also advantageously used as a one-stop solution for a quick, automated and customized audience engagement metrics. It is, therefore, an object of the disclosed invention to provide a method and system that provides a unified platform to analyze the performance of a brand by discovering and monitoring a brand's feedback on social media, analyzing content related to a brand, benchmarking with the industry and quantifying a brand's online social equity index. More particularly, the object of the invention is to facilitate computation of a quantifiable value as a social equity index of a brand driven by customer perception, loyalty and recall across the social media firmament. Yet another objective of the invention is to provide a reliable method and system to provide insights into the information available about a brand so as to enable the brand company to formulate an effective long-term strategy.

In view of these and other objects, the present invention relates to methods and systems for determination of equity index of a brand. More particularly, in one embodiment, the invention discloses a method for determining equity index of a brand. The method for determining equity index of the brand in real-time comprises building a data record by continuously procuring input data from at least one platform related to the brand. The data record is then enriched by enriching the data record to remove noise from the input data to obtain an enriched data record. The method further comprises classifying the enriched data record into at least one category of one or more categories to obtain a classified data record. Subsequently, a sentiment ratio for the classified data record and an engagement metrics for the brand are determined. Finally, the equity index for the brand is determined based on a weighted average of the at least one category, the sentiment ratio, the engagement metrics and one or more variables.

Further, the present invention relates to a system for determining a social equity index for a brand, wherein said system comprises a hardware processor and a data procurement module, coupled to the hardware processor, to build a data record by continuously procuring input data from at least one platform related to the brand. The system also comprises a data enrichment module, coupled to the hardware processor, to enrich the data record to remove noise from the input data to obtain an enriched data record. Further, the system comprises a classifier, coupled to the hardware processor, to classify the enriched data record into at least one category of one or more categories to obtain a classified data record. Further, the system comprises a sentiment analyzer, coupled to the hardware processor, to determine a sentiment ratio for the classified data record. Furthermore, the system comprises an engagement metric module, coupled to the hardware processor, to determine an engagement metrics for the brand. Finally, the system comprises an index formulation module, coupled to the hardware processor, to determine the equity index for the brand based on a weighted average of the at least one category, the sentiment ratio, the engagement metrics and one or more variables.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Some drawings may indicate the components using block diagrams and may not represent the internal circuitry of each component. It will be appreciated by those skilled in the art that disclosure of such drawings include disclosure of electrical components or circuitry commonly used to implement such components.

DETAILED DESCRIPTION OF THE INVENTION

The following description of example methods and systems is not intended to limit the scope of the description to the precise form or forms detailed herein. Instead, in the following description, for the purposes of explanation, various specific details are set forth in order to provide a thorough understanding of the disclosed embodiments. It will be apparent, however, that the disclosed embodiments may be practiced without these specific details.

Several features described hereafter can each be used independently of one another or with any combination of other features. However, any individual feature may not address any of the problems discussed above or might address only some of the problems discussed above. Some of the problems discussed above might not be fully addressed by any of the features described herein.

In accordance with the present subject matter, methods and systems are provided to analyze electronic content related to a brand and determine an equity index for the brand. The present disclosure encompasses extracting raw data from at least one platform including social media websites, mobile applications and industry specific blogs, websites and mobile applications. The extracted raw data is then processed/enriched so as to remove unwanted particulars from the raw data and interpret the text in the raw data accurately. The enriched data record is further processed to predict a sentiment of the data, a net sentiment and a theme out of one or more themes for the cleaned data, wherein the one or more themes are related to the brand. The data in the enriched data record is categorized into one or more themes. Furthermore, an equity index for a brand is computed based on the sentiment analysis and the theme categorization. The invention encompasses the social equity index such that the rise and fall in the equity index is relatable with the profitability of the brand. The invention further includes publishing the social equity index, theme trends, theme split and theme word cloud in real-time based on the analysis of the enriched data.

The above-mentioned systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 1:
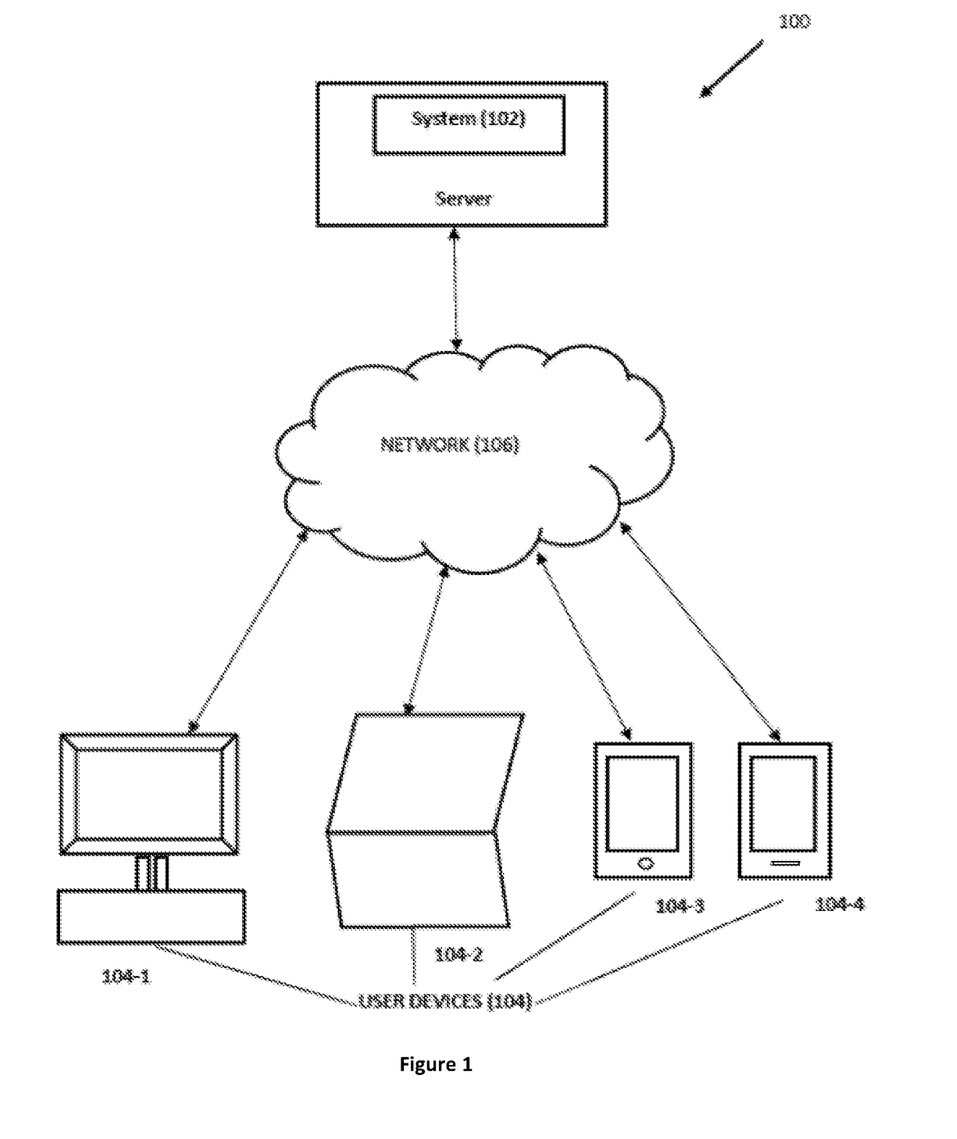
FIG. 1 illustrates an exemplary network environment in which a system for determining an equity index for a brand is implemented in accordance with an embodiment of the present disclosure.

FIG. 1 illustrates a network implementation of an exemplary architecture (100) including a system (102) for determining an equity index of a brand, in accordance with an embodiment of the present disclosure. More particularly, FIG. 1 illustrates a system (102), and one or more user devices (104) connected to the system (102) over a network (106), wherein the connection may include a physical connection (such as a wired/wireless connection), a logical connection (such as through logical gates of semiconducting device), other suitable connections, or a combination of such connections, as may be obvious to a skilled person. In one embodiment, the network (106) may be a wireless network, a wired network, or a combination thereof. The network may be implemented as one of the different types of networks, such as intranet, local area network (LAN), wide area network (WAN), the internet, etc. The network may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network (106) may include a variety of network devices, including routers, bridges, servers, computing devices, storage devices, etc.

Although the present disclosure is explained considering that the system (102) is implemented on a server, it is appreciated that the system (102) may also be implemented in a variety of computing systems, such as a laptop computer, a desktop computer, a notebook, a workstation, a mainframe computer, a phablet, a portable electronic device and the like. In one embodiment, the system (102) may be implemented in a cloud-based environment. It is also appreciated that the system (102) may be accessed by multiple users through one or more user devices 104-1, 104-2, . . . 104-n, collectively referred to as user devices (104) hereinafter, or applications residing on the client devices 104. Examples of the user devices (104) may be electronic devices including, but not limited to, a portable computer, a tablet computer, a personal digital assistant, a handheld device, a cellular phone, a wireless device and a workstation.

Figure 2:
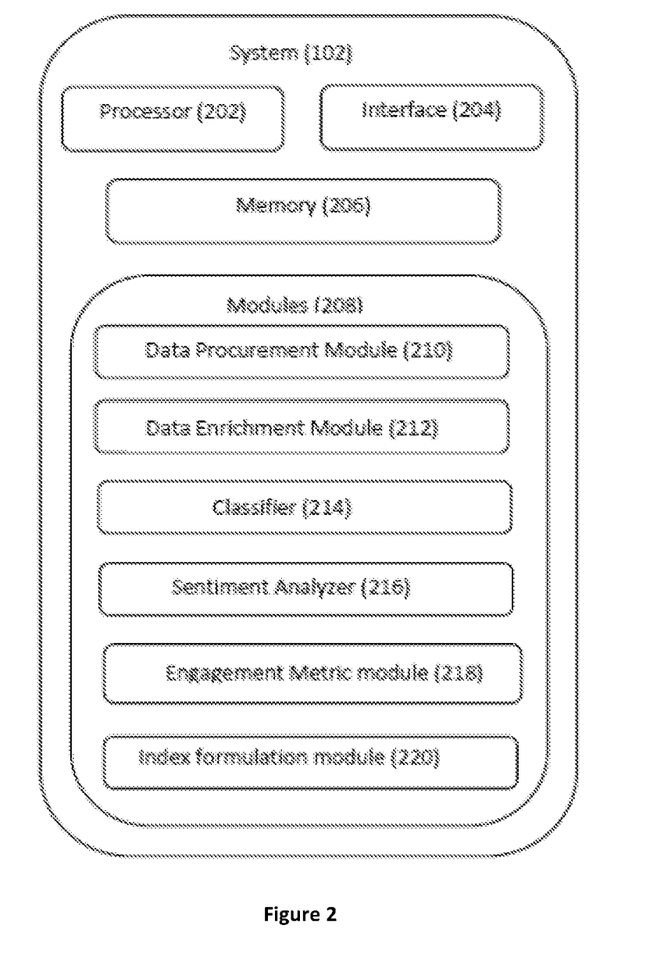
FIG. 2 illustrates an exemplary system for determining an equity index for a brand, in accordance with an embodiment of the present disclosure.

FIG. 2 illustrates a block diagram of a system (102) for analysis of electronic content, in accordance with exemplary embodiments of the present disclosure. The system, illustrated in FIG. 2, for analyzing electronic content is implemented through a specialized arrangement of structural components capable of executing the desired functionalities as described herein below. In one embodiment, the system (102) includes one or more processors (202), an Input/Output (I/O) Interface (204) and a memory (206). The one or more processors (202) are hardware processors and may be implemented as one or more microprocessors, microcomputers, microcontrollers, digital signal processors, central processing units, state machines, logic circuitries, and/or any devices that manipulate signals based on operational instructions. The one or more processors (202) are configured to fetch and process instructions (e.g. stored in the memory (206)) for execution within the system (102).

The I/O interface (204) includes a variety of software and/or hardware interfaces, for example, a web interface, a graphical user interface, etc. The I/O interface (206) allows the system (102) to interact with a user either directly or through the user devices (104). The user of the system (102) may include, but not limited to, a user accessing the system (102) to determine a social equity index for a brand and an administrator accessing the system (102) for configuration of system (102). Further, the I/O interface (204) may enable the system (102) to communicate with other application and computing devices, such as web servers and external data servers (not shown). The I/O interface (204) can facilitate multiple communications such as operating system to application communication, inter process communication within a wide variety of networks and protocol types, including wired networks (e.g. LAN, cable networks, etc.) and wireless networks (e.g., WLAN, cellular networks, or satellite networks). The I/O interface (204) may include one or more ports for connecting a number of devices to one another or to another server.

The memory (206) is coupled to the processor (202). The memory (206) includes any tangible, non-transitory computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the computing system (102) includes modules (208). The modules (208) may be coupled to the processor (202). The modules (208), amongst other things, include routines, programs, objects, components, physical structures, data structures, etc., which perform particular tasks or implement particular abstract data types. The modules (208) may also be implemented as, signal processor(s), state machine(s), logic circuitries, and/or any other device or component that manipulate signals based on operational instructions. In one embodiment of the present subject matter, the modules (208) may be computer-readable instructions which, when executed by a processor/processing unit, perform any of the described functionalities. The computer-readable instructions may be stored on an electronic memory device, hard disk, optical disk or other machine-readable storage medium or non-transitory medium. In one implementation, the computer-readable instructions can be also be downloaded to a storage medium via a network connection.

The modules (208) include a data procurement module (210), a data enrichment module (212), a classifier (214), a sentiment analyzer (216), an engagement metric module (218) and an index formulation module (220).

In one implementation, the data procurement module (210) is configured to build a data record by automatically procuring input data from at least one platform related to the brand associated with a product or a service. The input data may be procured between a particular date and time range. The at least one platform includes websites, forums and mobile applications relating to social media where consumers voice their opinion about the brands and websites, applications and forums dedicated to the domain of the brand. The input data has various kinds of data including, but not limited to, feedback posted by reviewers on blogs related to the domain of the brand and activities of consumers related to the brand in the form of posts, tweets, social media impressions, etc. The data procurement module (210) is configured to procure the input data continuously on receiving a request for determining the social equity index. The text in the input data may comprise special characters, punctuations, Uniform Resource Locators (URL), hashtags, acronyms, emoticons etc., wherein emoticons may be used to express sentiment in social media text.

The system (102) further comprises the data enrichment module (212) configured to enrich the data record built by the data procurement module (210), wherein enriching includes cleaning the data record by removing noise from the data record to obtain an enriched data record. Noise removal may include, but not limited to, removing non-consumer related data, incorrect/incomplete data, standardizing the format of the data throughout the data record, removing duplicate entries and correcting typographical errors. The data enrichment module (212) is configured to enrich the data record by processing the input data so as to remove special characters, articles, and hashtags. Special characters include HTML entities like ' ' (used for space) which are included in the input data while scrapping/procuring data. The data enrichment module (212) is configured to remove or keep the Uniform Resource Locator (URL) based on the interpretation of the URL and the type of information required. The data procurement module (210) is also configured to interpret emoticons to predict sentiments. For instance, emoticons ':)' and ':>' may be converted to words like 'happy' which are further used in performing sentiment analysis. The data enrichment module (212) is further configured to enrich the data record by making all text in the data record uniform such as by converting all text into lower case to create uniformity, except where just the first word is in uppercase, wherein Part of speech (POS) taggers are employed for identifying the words. Further, data enrichment module (212) is configured to employ regular expressions to interpret acronyms such as 'LOL' is converted to 'laugh out loud', words with emphasis such as 'gooooooooood' is converted to good and words which are used as expressions or as parts of informal vocabulary on internet, for example, 'hahhahah' is converted to 'laugh' and 'nyt' is converted to 'night'. The data enrichment module (214) is further configured to perform stemming on the raw input data in the data record i.e. removing words like 'ing' and 'ed' etc. to bring all text at the same level before performing analysis. The data enrichment module (212) is also configured to interpret punctuations such as a comma in a given text in the data record based on the context. The output from the data enrichment module (212) i.e. the enriched data record is further transmitted to the classifier (214).

The classifier (214) includes one or more underlying categories and is configured to classify the enriched data record into at least one category of one or more categories to obtain a classified data record, for example, each tweet related to the brand procured from the social networking web site 'Twitter' present in the enriched data record is classified into at least one category. The one or more categories are based upon the domain of the brand and depicts the theme of the data record, for instance, in case of airlines industry, the underlying categories to which the data in the enriched data record is classified include, but not limited to, Baggage, Reservations, Cancellations, Refunds, Digital and Customer Experience. The classifier (214) is configured to classify the enriched data record by a self-learning mechanism wherein phrases specific to the brand such as consumer's feedback to the brand, are identified and mapped onto one or more categories. The classifier (214) is further configured to identify factors impacting the social equity index of brand based upon the classification of the enriched data record. In an embodiment, the one or more categories may be further modified by a user accessing the system (102).

The sentiment analyzer (216) is configured to determine a sentiment ratio by computing a positive sentiment and a negative sentiment expressed in the classified data record. The sentiment analyzer (216) is configured to perform a sentiment analysis using a three step approach. Firstly, the sentiment analyzer (216) is configured to analyze the classified data record based on a pre-defined set of keywords and a rule base in the system (102) so as to identify and categorize the sentiment for the each of the various kinds of data in the classified data record into one of a positive sentiment and a negative sentiment. Subsequently, the sentiment analyzer (216) is configured to refine the above mentioned categories by identifying the sentiment for each of the various kinds of data in the classified data record into one of a positive sentiment, a negative sentiment and a neutral sentiment. This is achieved by a self-learning mechanism of the sentiment analyzer (216), wherein classified data record including various kinds of brand related consumer activities such as brand mentions, social media posts, tweets is trained using a rule based engine and Support Vector Machine (SVM) algorithm. In other embodiments, machine learning algorithms such as K-Means and Naïve Bayes are used. Finally, the sentiment analyzer (216) is further configured to fine-tune the categorization of the classified data record based upon a deep learning model, wherein the deep learning model is based on deep neural networks trained using the dataset obtained from the sentiment analyzer (216) in the above two steps. The sentiment analyzer (216) is configured to categorize the classified data sensitively into one of a positive sentiment and a negative sentiment with accuracy. Furthermore, the sentiment analyzer (216) is configured to compute a sentiment ratio as a ratio of net positive sentiment data and total sentiment data (positive and negative). In a preferred embodiment, the sentiment ratio is a value which ranges from −1 (extremely negative) to +1 (extremely positive).

The system further comprises an engagement metrics module (218) to compute an engagement metrics for measuring the social engagement of the brand, wherein the engagement metrics includes one or more of a conversation rate of the consumer with the brand, an amplification rate of the content related to the brand and an applause rate of the content related to the brand by the consumers. The conversation rate is a rate at which a response on input data related to the brand is received such as the number of replies or comments received on an online post posted by the brand company. The amplification rate is a rate at which the input data related to the brand is further shared such as the rate at which an online post posted by the brand company is re-shared or retweeted to more audience. Further, an applause rate is the rate at which an input data related to the brand is applauded such as the rate at which an online post posted by the brand company is liked, loved or favorited.

Further, the system (102) includes an index formulation module (220) configured to determine the equity index for the brand based on a weighted average of the at least one category, the sentiment ratio, the engagement metrics and one or more variables. The one or more variables, include, but are not limited to, brand mentions across the at least one platform, category classification, sentiment analysis, virality, social capital (such as the number of followers of a brand's online page) and reach, volume and frequency of the input data. The weightage values assigned to the at least one category, the sentiment ratio, the engagement metrics and the one or more variables is based on the computation of the impact on the overall equity index of the brand.

The invention encompasses a cause and impact relationship between the abovementioned variables and the social equity index of the brand, for instance, higher the net positive sentiment, higher would be the overall social equity index assuming all other variables remains constant and assigned a higher weightage to the most influential themes/categories which will drive the overall equity index. The index formulation module (220) configured to determine the equity index of the brand as a numeric value ranging from 0 to 100. The invention further encompasses benchmarked the equity index of a branch with the equity index of the competitor brands and relevant industry as a whole based on the above mentioned variables. In an embodiment, the variables are assigned different weightages for different brands.

The index formulation module (220) is further configured to publish the social equity index of the brand. In an embodiment, the social equity index of the brand may be published along with the social equity index computed for competitive brands. In another embodiment, the index formulation module (220) is also configured to publish each conversation on social media determined to be relevant to the brand, classified into the one or more categories as per industry of the brand. In an embodiment, the invention enables drilling down on themes/categories related to the brand, identifying top factors influencing the brand and publishing performance of the brand region-wise. The invention further encompasses publishing trends in theme and theme word cloud based on the analysis by the index formulation module (220). In an embodiment, the equity index, the conversation, the theme trends and the theme word clouds are published on the user interface of a user device using the I/O interface (204).

Figure 3:
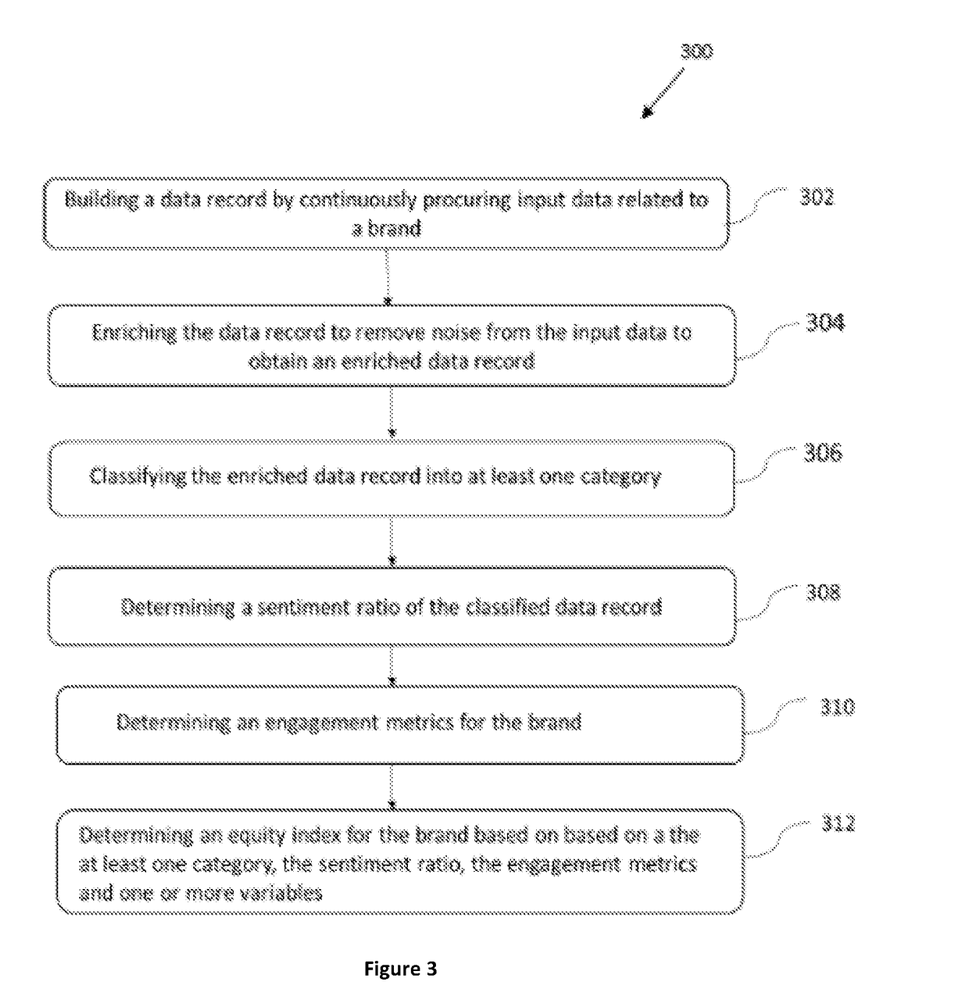
FIG. 3 illustrates an exemplary method for determining an equity index for a brand, in accordance with an embodiment of the present disclosure.

FIG. 3 describes a high level step by step equity index determination mechanism with the flow of actions performed in the whole process. The method 300 of FIG. 3 implements the system of FIG. 2. FIG. 3 describes the process 300 of determining an equity index of a brand, when a request for determining the equity index is communicated by a user.

Step 302 includes building a data record by procuring input data from at least one platform related to the brand. The at least one platform from which input data about the brand is procured includes social media websites, social media mobile applications, and websites and forums specific to a domain of the brand. In one embodiment, the input data is procured continuously and in real-time.

At step 304, the data record built by procuring the input data is enriched by removing noise from the input data to obtain an enriched data record. The noise from the data record is removed by processing the raw input data so as to remove special characters, articles and hashtags, interpreting URLs, interpret acronyms, emoticon, punctuations and informal vocabulary used on the social media environment which are not a part of the dictionary, converting all text into uniform case, words which are used as expressions or as parts of informal vocabulary on internet, stemming on the input data in the data record.

Step 306 includes classifying the enriched data record into at least one category of one or more categories to obtain a classified data record, wherein the one or more categories are based upon the domain of the brand and depicts the theme of the data record. The classification of the data record is performed by a self-learning mechanism wherein phrases specific to the brand are identified and mapped onto one or more categories. Step 306 further includes identifying factors impacting the social equity index of the brand based upon the classification of the enriched data record.

Further, at step 308, a positive sentiment and a negative sentiment expressed in the classified data record are identified. A sentiment ratio of the sentiment for the classified data record is determined as a ratio of net positive sentiment data and sum of sentiment data (positive and negative), wherein the net positive sentiment in the data and total sentiment in the data is computed by: identifying positive and negative sentiments for the data by analyzing the classified data record based on a set of keywords and rule base; identifying one of a positive sentiment, a negative sentiment and a neutral sentiment for each kind of data in the classified data record based on a rule based engine and machine learning mechanism; and fine-tune the categorization of sentiment for each kind of data in the classified data record based on deep learning neural network trained using the dataset obtained in the above two steps. In a preferred embodiment, the sentiment ratio is a value which ranges from −1 to +1, wherein −1 is extremely negative and +1 is an extremely positive value.

Furthermore, at step 310, an engagement metrics is computed for measuring the social engagement of the brand, wherein the engagement metrics includes one or more of a conversation rate of the consumer with the brand, an amplification rate of the content related to the brand and an applause rate of the of the content related to the brand by the consumers.

Finally, at step 312, an equity index is determined for the brand based upon a weighted average of the at least one category, the sentiment ratio, the engagement metrics and one or more variables. The equity index for the brand is further based upon a weighted average of one or more variables, wherein one or more weightage values is assigned to the at least one category, the sentiment ratio, the engagement metrics and the one or more variables based on the computation of the impact on the overall equity index of the brand. The one or more variables include, but are not limited to, the one or more variables include brand mentions across the at least one platform, category classification, virality, social capital and reach, volume and frequency of the input data. The step 310 also includes publishing the equity index of the brand.

It will be appreciated by those skilled in the art that the system and method described herein above helps in computation of social equity index of brands by correctly and effectively interpreting electronic content. In one embodiment, the system and method encompassed by the present invention may be used in determining business decisions including long-term strategies with regard to the brand in light of the customer perception, competitor's strength and trends in the relevant industry.

Although implementations for methods and systems for determining equity index of a brand have been described in language specific to structural features and/or methods, it is to be understood that the appended claims are not necessarily limited to the specific features or methods described. Rather, the specific features and methods are disclosed as examples of implementations for determination of equity index.

We claim:

1. A computer implemented method for determining an equity index for a brand in real-time, the method comprising:
    building a data record by continuously procuring input data from at least one platform related to the brand, wherein the data record comprises one or more of brand mentions, social media posts, and tweets;
    enriching the data record to remove noise from the input data to obtain an enriched data record;
    classifying the enriched data record into at least one category of one or more categories to obtain a classified data record
    determining a sentiment ratio for the classified data record, wherein the sentiment ratio is a ratio of net positive sentiment data and sum of positive and negative sentiment data;
    determining an engagement metrics for the brand, wherein determining the sentiment ratio comprises:
        analysing the classified data record based on a pre-defined set of keywords and rules to classify the data in the classified data record into one of positive sentiment and negative sentiment;
        analysing the classified data record using a self-learning mechanism to refine the classification of the data in the classified data record into positive sentiment, negative sentiment, and neutral sentiment, wherein the self-learning mechanism is trained using a rule based engine and a Support Vector Machine (SVM) algorithm; and
        further refining classification of the data in the classified data record using a deep learning model that is based on a deep neural network trained using data sets obtained from the analysis of the classified data record based on a pre-defined set of keywords and rules and the analysis of the classified data record using the self-learning mechanism; and
    determining the equity index for the brand based on a weighted average of the at least one category, the sentiment ratio, the engagement metrics and one or more variables.

2. The method of claim 1, further comprising comparing the equity index for the brand with an equity index for one or more other brands.

3. The method of claim 1, wherein the at least one platform includes social media websites, social media mobile applications, and websites and forums specific to a domain of the brand.

4. The method of claim 1, wherein enriching the data record includes one or more of stemming, removing special characters and punctuations and interpreting one or more of Uniform Resource Locators (URLs), hashtags, emoticons, stop words and abbreviated text in the input data.

5. The method of claim 1, wherein the one or more categories are related to the domain of the brand.

6. The method of claim 1, wherein the engagement metric includes one or more of a conversation rate, an amplification rate, and an applause rate thereof.

7. The method of claim 1, wherein the one or more variables include brand mentions across the at least one platform, category classification, sentiment analysis, virality, social capital and reach, volume and frequency of the input data.

8. A system for determining a social equity index for a brand, the system comprising:
    a hardware processor;
    a data procurement module, coupled to the hardware processor, to build a data record by continuously procuring input data from at least one platform related to the brand, wherein the data record comprises one or more of brand mentions, social media posts, and tweets;

a data enrichment module, coupled to the hardware processor, to enrich the data record to remove noise from the input data to obtain an enriched data record;

a classifier, coupled to the hardware processor, to classify the enriched data record into at least one category of one or more categories to obtain a classified data record;

a sentiment analyzer, coupled to the hardware processor, to determine a sentiment ratio for the classified data record, wherein the sentiment analyzer is configured to determine the sentiment ratio as a ratio of net positive sentiment data and sum of positive and negative data through he following steps:

analyse the classified data record based on a pre-defined set of keywords and rules to classify the data in the classified data record into one of positive sentiment and negative sentiment;

analyse the classified data record using a self-learning mechanism to refine the classification of the data in the classified data record into positive sentiment, negative sentiment, and neutral sentiment, wherein the self-learning mechanism is trained using a rule based engine and a Support Vector Machine (SVM) algorithm; and refine classification of the data in the classified data record using a deep learning model that is based on a deep neural network trained using data sets obtained from the analysis of the classified data record based on a pre-defined set of keywords and rules and the analysis of the classified data record using the self-learning mechanism; and an engagement metric module, coupled to the hardware processor, to determine an engagement metrics for the brand; and an index formulation module, coupled to the hardware processor, to determine the equity index for the brand based on a weighted average of the classified data record, the sentiment ratio, the engagement metrics and one or more variables.

9. The system of claim 8, further comprising comparing the equity index for the brand with an equity index for one or more other brands.

10. The system of claim 8, wherein the at least one platform includes social media websites, social media mobile applications, and websites and forums specific to a domain of the brand.

11. The system of claim 8, wherein the data enrichment module is configured to enrich the data record by one or more of stemming , removing special characters and punctuations, and interpreting one or more of Uniform Resource Locators (URLs), hashtags, emoticons, stopwords, and abbreviated text in the input data.

12. The system of claim 8, wherein, the one or more categories are related to the domain of the brand.

13. The system of claim 8, wherein the engagement metrics includes one or more of a conversation rate, an amplification rate, and an applause rate.

14. The system of claim 8, wherein the one or more variables include brand mentions across the at least one platform, category classification, sentiment analysis, virality, social capital and reach, volume and frequency of the input data.

\* \* \* \* \*